United States Patent Office 3,767,728
Patented Oct. 23, 1973

3,767,728
COATING COMPOSITIONS AND SOLID
SURFACES COATED THEREWITH
Michael Langsam and Gerald Jerome Mantell, Allentown, Pa., assignors to Air Products and Chemicals, Inc., Allentown, Pa.
No Drawing. Continuation-in-part of abandoned application Ser. No. 769,421, Oct. 21, 1968. This application Feb. 12, 1971, Ser. No. 115,138
Int. Cl. C08f 27/18, 37/18; C08g 37/32
U.S. Cl. 260—853          10 Claims

ABSTRACT OF THE DISCLOSURE

Copolymers prepared from a fluorine-containing monomer and an ethylenically unsaturated monomer containing an amide group are reacted with aldehyde to form thermosettable polymers. Mixtures of such thermosettable fluorine-containing copolymers with thermosettable non-fluorine-containing copolymers provide useful resinous coating compositions for solid substrates.

BACKGROUND OF THE INVENTION

This application is a continuation-in-part of application Ser. No. 769,421, filed Oct. 21, 1968, now abandoned.

The present invention relates to new and useful fluorine-containing copolymers; to polymeric mixtures of thermosettable fluorine-containing copolymers with non-fluorine-containing copolymers which mixtures are suitable for use as compositions for solid substrate materials and to tough and mar-resistant films formed by heating or baking said coating compositions, which films render the coated substrate oleophobic (oil repellent) and hydrophobic (water repellent).

Because of their low surface energies, fluorinated solids have the most non-wettable and non-adhesive surfaces known. It has been established that only the outermost molecules on the surface of a solid need to be highly fluorinated in order to achieve a surface having extremely low free surface energy. Accordingly, it is now possible to provide mixtures of fluorine-containing and non-fluorine-containing polymers which are as effective for rendering a surface oil and water repellent as a material containing only fluorine-containing material, provided the polymeric mixture may be cured in a manner such as to impart oleophobic and hydrophobic characteristics to the surface. Since the fluorine-containing copolymers are expensive, the previously described mixtures provide less expensive compositions that contain the advantages of the fluorine containing polymers alone.

The critical surface tension of a solid surface is indicative of the oleophobic and hydrophobic characteristics of that surface. Determination of the critical surface tension can be made by measurement of the contact angles of wetting by a series of related liquids. Provided a treated surface is sufficiently smooth and clean, the equilibrium contact angle θ of a single drop of any pure liquid on the horizontal surface is a reproducible property which can be measured at the solid-liquid-gas interface by a goniometer. A Zisman plot of cosine θ vs. the surface tension of the liquid in the series is then made and the graphical intercept where cosine θ is equal to 1, i.e., where θ is zero (thus defining a condition of complete wetting), is obtained by extrapolation. This graphical intercept is defined as the critical surface tension of wetting (dynes/cm.). As shown in Naval Research Laboratory Report No. 6324, dated Oct. 21, 1965, the use of any homologous series of liquids results in essentially the same value for the critical surface tension wetting.

SUMMARY OF THE INVENTION

The thermosettable polymeric mixtures of the present invention comprise a mixture of:

(a) From about 0.1% to about 10% by weight of a thermosettable fluorine-containing copolymer prepared from reacting an aldehyde having the structure:

$$R-\overset{O}{\underset{\|}{C}}-H$$

where R is H, a $C_1$–$C_4$ alkyl group or

with a copolymer comprising from about 5% to about 30% by weight of at least one polymerizable amide-containing monomer having the structure:

$$CH_2=\overset{R_1}{\underset{|}{C}}-CONHR_2$$

where $R_1$ is H or $CH_3$ and $R_2$ is H or a $C_1$–$C_4$ alkyl group, and from about 70% to about 95% by weight of a monomer having the structure:

$$R_fP$$

where $R_f$ is $R_1(CF_2)_aCH_2$—, where $R_1$ is H or F and $a$ is an integer from 1 to 20 $(CF_3)_2CR_2(CH_2)_b$, where $R_2$ is F or H when $b$ is 0 and $R_2$ is F when $b$ is 1–18, or $$R_3(c-C_6F_{10})CH_2—,$$

where $R_3$ is F or $C_nF_{2n+1}$ and $n$ is an integer from 1–4 and c- designates an alicyclic structure, and
P is $CH_2=CR_4COO$—, where $R_4$ is H or $CH_3$, and (b) From about 99.9% to about 90% by weight of a thermosettable non-fluorine-containing copolymer (i) prepared from reacting an aldehyde having the structure:

$$R-\overset{O}{\underset{\|}{C}}-H$$

where R is H, a $C_1$–$C_4$ alkyl group or

with a copolymer comprising from about 97% to about 75% by weight of at least one ethylenically unsaturated hydrocarbon monomer and from about 3% to about 25% by weight of the polymerizable amide-containing monomer having the structure:

$$CH_2=\overset{R_1}{\underset{|}{C}}-CONHR_2$$

where $R_1$ is H or $CH_3$ and $R_2$ is a $C_1$–$C_4$ alkyl group, or (ii) prepared from reacting from about 97% to about 75% by weight of at least one ethylenically unsaturated hydrocarbon monomer and from about 3% to about 25% by weight of a monomer having the structure:

$$CH_2=\overset{R_1}{\underset{|}{C}}-COM$$

where $R_1$ is H or $CH_3$ and
M is —OH, —O—$CH_2$—$CHR_2OH$, where $R_2$ is H or a $C_1$–$C_4$ alkyl group $$-OCH_2-\overset{}{\underset{\diagdown O \diagup}{CH-CH_2}}$$

or —O—$CH_2CH=CH_2$.

The thermosettable compounds of Y of the invention are provided in a physical mixture of the thermosettable fluorocarbon copolymers E and non-fluorine-containing copolymers H as hereinafter defined. Compounds Y, on sufficient heating, will cross-link to form thermoset polymers.

The fluorine-containing copolymers $C_a$ of the present invention have a molecular weight below 10,000 and preferably have a molecular weight in the range of between 1500 and 3000. Specifically, copolymers are obtained by reacting from about 5 to about 30% by weight of an ethylenically unsaturated monomer containing an amide group B, preferably about 15% by weight, with from about 70 to about 95% by weight of a fluorocarbon acrylic monomer A. The copolymers are soluble in non-halogenated organic solvents, such as butanol or xylene or mixtures thereof, and contain sufficient fluorine of the proper structural form to render the copolymers oleophobic.

The thermosettable polymeric mixtures of the present invention, after being applied to a desired solid substrate, can be cured at moderately elevated temperatures with or without added catalyst. When the mixtures of the present invention are cured, the repellency characteristics of the fluorine-containing copolymer are imparted to the surface of the air-film interface. It has been discovered that the mixtures may contain as low as about 0.1% by weight of the thermosettable fluorine-containing copolymer to provide both hydrophobic and oleophobic characteristics to coatings on solid substrates such as metal, wood, concrete, glass and plastics. Surprisingly, it is not necessary to employ more than about 10% by weight of the thermosettable fluorine-containing copolymer in the mixtures of the present invention. Nevertheless, higher and lower percentages of thermosettable fluorine-containing copolymer can be employed, the upper limit being determined by economic considerations.

The present invention also includes dispersions or latexes comprising the thermosettable polymeric mixtures and materials treated with such mixtures. In addition, the invention includes a process for treating solid substrates for the purpose of obtaining a film surface which is mar-resistant, moisture and solvent resistant, stain resistant, heat resistant and corrosion resistant. This process comprises treating a solid substrate with the thermosettable polymeric mixture as heretofore described and heating the treated substrate at a temperature from about 75° C. to about 200° C. for a period of from about ten minutes to about ten hours to provide a thermoset surface on the substrate.

DESCRIPTION OF THE PREFERRED EMBODIMENTS

In accordance with the present invention, thermosettable polymeric compositions (Y) are provided in a mixture comprising a fluorocarbon amide-containing copolymer (E) and a non-fluorine-containing copolymer (H). The copolymer E may be produced in a manner set forth in reaction I:

(I) $\quad A+B \rightarrow C_a + D \rightarrow E$ where

A is a fluorocarbon acrylic monomer,
B is an amide-containing acrylic monomer,
$C_a$ is a fluorocarbon amide-containing acrylic copolymerization product of A+B,
D is an aldehyde, and
E is a fluorocarbon amide-containing thermosettable copolymer.

As indicated in reaction I above, the copolymers $C_a$ are formed by copolymerizing from about 5% to about 30% by weight of an ethylenically unsaturated monomer B containing an amide group with from about 70% to about 95% by weight of a fluorocarbon acrylic monomer A. The fluorocarbon acrylic monomers A may be represented by the general structure $R_fP$ as described above. Typical A types of fluorocarbon acrylic monomers are represented by the following structures:

$CH_2C(CH_3)COOCH_2(c-C_6F_{11})$*
$CH_2C(CH_3)COOCH_2(CF_2)_7F$
$CH_2C(CH_3)COOCH(CF_3)_2$
$CH_2C(CH_3)COOCH_2(CF_2)_4H$
$CH_2CHOOCH_2(CF_2)_6H$
$CH_2C(CH_3)COOCH_2(CF_2)_{10}H$
$CH_2C(CH_3)COO(CF_2)_5CF(CF_3)_2$
$CH_2CHCOOCH_2CF_2H$
$CH_2C(CH_3)COOCH_2(c-C_6F_{10})CF_3$*

*c- designates an alicyclic structure.

The A monomers are copolymerized with a particular type amide-containing acrylic monomer B to provide a fluorocarbon, amide-containing acrylic copolymer $C_a$. The B monomers may be represented by the general structure:

$$CH_2=C(R_1)CONHR_2$$

where $R_1$ is H or $CH_3$ and $R_2$ is H or a $C_1-C_4$ alkyl group.

It is important to note that the copolymer $C_a$ must be reacted with an aldehyde D to provide the particular fluorocarbon, amide-containing thermosettable copolymer E. Compounds such as methylol acrylamide are not within the scope of the invention since the use of such compounds in preparing the particular amide-containing copolymer would produce a thermoset or cross-linked copolymer as opposed to the desirable thermosettable or non-cross-linked copolymers which are employed in the invention. This methylolation reaction is essential to convert the copolymer $C_a$ to a thermosettable copolymer E. The aldehyde which may be employed in the invention may be represented by the structure:

$$\underset{\text{R}-\overset{\overset{\text{O}}{\|}}{\text{C}}-\text{H}}{}$$

where R is H, a $C_1-C_4$ alkyl group, or

Examples of the types of aldehydes that may be employed in the reaction include formaldehyde, alcohol solutions of formaldehyde, acetyl aldehyde, butyraldehyde, isobutyraldehyde, furfuraldehyde and the like. Formaldehyde, the preferred aldehyde, can be employed in the form of paraformaldehyde, hexamethylene tetramine or as an alcohol or water solution. The alcohol solution of formaldehyde, particularly the n-butanol solution containing about 40% aldehyde, is the preferred material for reaction with said fluorine-containing and non-fluorine-containing copolymers. It is usually desirable to use at least 1.7 mols of formaldehyde per mol of formaldehyde-reactable amide side chains in the respective copolymers, although molar ratios ranging from about 0.4 to 3 mols of aldehyde to mols of reactable amide side chains may also be used.

The fluorocarbon amide-containing thermosettable copolymer E may be mixed with a non-fluorine-containing copolymer H to provide the thermosettable polymeric mixtures Y as illustrated by reaction II:

(II) $\quad E+H \rightarrow Y$

However, it is to be understood that either of two types of H copolymers ($H_1$ and $H_2$) may be mixed with copolymer E. The $H_1$ copolymers are similar to the copolymers E except that they contain no fluorine and may be produced in accordance with reaction III:

(III) $\quad Z+B \rightarrow C_z + D \rightarrow H_1$ where

Z is a nonfunctional ethylenically unsaturated hydrocarbon monomer,
B is an amide-containing acrylic monomer,
$C_z$ is an amide-containing acrylic copolymerization product of $Z+B$,
D is an aldehyde, and
$H_1$ is an amide-containing thermosettable acrylic copolymer.

Reactions I and III are similar in that they both provide thermosettable copolymers containing amide groups. That is, both $C_a$ and $C_z$ copolymers must be reacted with an aldehyde, as hereinbefore described, in a methylolation reaction to provide the thermosettable copolymers E and $H_1$. However, the reactions differ in that, in reaction I, A is a fluorocarbon acrylic monomer providing copolymer E containing fluorine and, in reaction III, Z contains no fluorine to provide the copolymer $H_1$ the non-fluorine containing copolymer.

The Z-type of nonfunctional ethylenically unsaturated monomer employed in reaction III includes at least one of (1) alkyl acrylates and methacrylates such as:

ethyl acrylate and methacrylate
isobutyl acrylate and methacrylate
hexyl acrylate and methacrylate
octyl acrylate and methacrylate
methyl acrylate and methacrylate
propyl acrylate and methacrylate
isoamyl acrylate and methacrylate
octadecyl acrylate and methacrylate
cetyl acrylate and methacrylate (2) vinyl esters of aliphatic acids, such as vinyl acetate, vinyl caprylate, vinyl stearate; (3) styrene and alkyl styrenes such as methyl styrene, (4) vinylidene halides such as vinylidene fluoride and vinylidene chloride, (5) vinyl alkyl ketones such as vinyl ethyl ketone and vinyl methyl ketone; (6) 1-3 butadiene, (7) vinyl ethers, (8) vinyl halides, and the like.

Representative $H_1$ types of polymers are listed below where AA represents an ethylenically unsaturated monomer containing an amide group:

AA/methyl acrylate/styrene
AA/butyl methacrylate
AA/methyl methacrylate
AA/vinyl toluene
AA/acrylonitrile/ethyl acrylate
AA/chloroprene/styrene
AA/vinyl chloride/ethylacrylate
AA/butadiene/styrene
AA/methyl methacrylate/ethyl acrylate
and the like.

The $H_2$ copolymers are produced in accordance with reaction IV:

(IV)     $Z+Q \rightarrow H_2$ where
Z is a defined above,
Q is a functional, ethylenically unsaturate monomer, and
$H_2$ is a thermosettable acrylic monomer.

The Q monomers may be represented by the general structure:

$$CH_2=CR_1COM$$

where $R_1$ is H or $CH_3$, and
M is $-OH$, $-O-CH_2-CH_2OH$, where $R_2$ is H or a $C_1$ to $C_4$ alkyl group

, or $-O-CH_2CH=CH_2$

Such monomers are readily copolymerized with Z monomers to provide the non-fluorine-containing thermosettable acrylic copolymers $H_2$.

The advantages of the invention are found in the particular properties exhibited by the fluorine-containing copolymer E; however, such copolymers are quite expensive to produce. Therefore, it has been found that, by mixing minor amounts of the copolymers E with major amounts of the $H_1$ or $H_2$ copolymers (Procedure II), an economical, functionally desirable thermosettable polymeric composition Y can be produced.

Both the fluorine-containing copolymers and the non-fluorine containing copolymers of the present invention are readily prepared by copolymerizing the respective monomers in accordance with techniques known to the art, such as by means of solution polymerization and emulsion polymerization techniques using a free radical polymerization initiator.

In solution polymerization, the combined monomers are dissolved at a concentration of about 15 to about 70% by weight. The preferred solvents for the preparation of these copolymers are ones in which all of the monomer components and the resulting copolymer are soluble. Isopropyl alcohol, n-butyl alcohol, xylene, and dimethoxyethane are examples of particularly useful solvents that may be used alone, or in combination. Where desired, relatively low boiling solvents, such as isopropyl alcohol and acetone, provide a means for controlling the reaction.

A copolymerization temperature of between 25° C. and about 150° C. may be employed, the preferred range being between about 60° C. and about 120° C. The reaction may be carried out for any desired length of time, generally one to four hours.

Normally, a catalyst is employed as a copolymerization initiator at a concentration of from 0.1 to 4% by weight of the reaction mixture. Suitable catalysts are benzoyl peroxide, lauroyl peroxide, acetyl peroxide, cyclohexanone peroxide, tertiary butyl peroxide, p-methane hydroperoxide, tertiary butyl hydroperoxide and cumene hydroperoxide. Azo-catalysts, such as azo-bisosobutyronitrile, may also be employed. It is usually desirable to add the initiator proportion-wise to a mixture of all other ingredients at the desired reaction temperature, in order to moderate the highly exothermic reaction.

When it is desired to produce a solution of high solids content and of relatively low viscosity suitable for coating purposes the use of a chain modifying agent is normally desired to control the molecular weight. Preferred modifying agents are octyl mercaptan, decyl mercaptan, normal or tertiary dodecyl mercaptan, usually in the concentration range of 0.3 to 3% by weight. Other modifying agents which may be used are pentachloroethane and trichlorobromomethane.

Emulsion polymerization is carried out in a reaction vessel fitted with a stirrer and external means of either heating or cooling the charge. The monomers to be copolymerized are emulsified in water solution of a surface-active agent to a given emulsion concentration of from about 5% to about 50%. Usually, the temperature is raised to between 30° C. and 70° C. to effect copolymerization in the presence of an added catalyst. Suitable catalysts include benzoyl peroxide, lauroyl peroxide, t-butyl perbenzoate, 1-hydroxycyclohexyl hydroperoxide, t-butyl peroxide, t-butyl hydroperoxide, 3-carboxypropionyl peroxide, acetylperoxide, 2,2'-azodiisobutyramidine dihydrochloride, 2,2'-azodiisobutyronitrile, 2,2'-azobis (2,4-dimethyl-4-methoxyvaleronitrile), sodium peroxide, barium peroxide, hydrogen peroxide, ammonium persulfate, potassium persulfate and the like. The concentration of the catalyst for the copolymerization is usually between 0.01% and 2% based on the weight of the monomers.

Anionic, cationic or non-ionic emulsifying agents can be employed as the surface-active agent to stabilize the emulsion during its makeup and copolymerization, but preferably a surface-active agent of the cationic or non-ionic type is employed. Representative anionic emulsifying agents are alkyl ($C_{10}$ to $C_{18}$) sodium sulfate, sodium alkyl ($C_{12}$ to $C_{18}$) benzene sulfonate, sodium alkyl naphthalene sulfonate, the sodium salt of sulfated alkenyl ($C_{16}$ to $C_{18}$) acetate, sodium oleate, the sodium salt of sulfated methyl oleate and ammonium perfluoroalkanoate. The cationic agents that may be employed include dodecyltrimethyl ammonium acetate, trimethyltetradecyl ammonium chloride, hexadecyltrimethyl ammonium bromide, trimethyl octadecyl ammonium chloride, (dodecyl-methyl benzyl)-trimethyl ammonium chloride, benzyl dodecyldimethyl ammonium chloride and N-[2-(diethylamino)-ethyl] oleamide hydrochloride.

Non-ionic surface active agents that may be employed include condensation products of ethylene oxide with hexylphenol, isooctylphenol, hexadecanol, oleic acid, alkane ($C_{12}$ to $C_{16}$) thiols, alkyl ($C_{12}$ to $C_{18}$) amines and the like. In addition, small amounts of chain transfer agents may be present during the copolymerization, such as, for example, an alkanethiol of 4 to 12 carbon atoms.

Suitable substrates for the application of the thermosettable polymeric mixtures of this invention are solid materials such as tin plate, black iron, phosphated steel, cold-rolled steel, aluminum foil, wood, glass, plastics, concrete and wall boards. The coating compositions obtained from said thermosettable polymeric mixtures form films on these solid substrates with excellent flexibility, excellent adhesion and freedom from undesirable color formation. Moreover, these outstanding properties are obtained together with mar-resistance, heat resistance, detergent resistance and corrosion resistance. These properties render the thermosettable polymeric mixtures of this invention useful in finishes for application to appliances, such as ranges, refrigerators, air conditioners, washers and water heaters, and also useful in exterior surfaces, such as aluminum sidings and awnings.

The thermosettable polymeric mixture of the present invention is applied by brushing, dipping, spraying, padding, roll-coating or by any combination of these methods. Preferably, the mixture is applied to a solid substrate from an organic solution.

The mixture may be cured by heating the coated surface for ten minutes to ten hours at a temperature between about 75° C. and about 200° C. An acid catalyst, such as 0.1 to 1% of oxalic acid, trichloroacetic acid, p-toluene sulfonic acid or phosphoric acid may be added to the mixture before application to the surface if shorter cure times or lower temperatures are required. For instance, the addition of 0.5% by weight phosphoric acid may be expected to produce a 30 minute cure at 90° C. which is equivalent to an uncatalyzed 30 minute cure at 170° C. The resulting coated material is resistant to water and oil.

A fuller understanding of the invention will be obtained from the following examples. It is to be understood that these examples are for illustrative purposes only and are not intended to limit the scope thereof.

Example 1

The following ingredients were added to a two liter, three neck round bottom flask equipped with a stirrer, a reflux condenser, and a thermometer:

Ethyl acrylate _____grams__ 225
Styrene _____do____ 200
Acrylamide _____do____ 75
n-Butanol _____do____ 500
n-Dodecyl mercaptan _____milliliters__ 12

The mixture was then heated with an oil bath to reflux conditions. While stirring the heated mixture, a 50% solution of cumene hydroperoxide was added periodically to the mixture in the following manner:

| Time (hrs.) | 0 | 1.5 | 3 | 4.5 | 6 | 7.5 |
|---|---|---|---|---|---|---|
| Cumene hydroperoxide (ml.) | 2 | 2 | 2 | 2 | 2 | 0 |
| Conversion (percent) | 0 | 46.2 | 56.9 | 67.9 | 81.3 | 90.1 |

After nine hours the mixture was cooled and maintained at room temperature overnight. The following ingredients were added to the cooled mixture:

Maleic anhydride _____grams__ 0.75
Butyl Formcel (40% by weight of formaldehyde, 53% by weight of n-butanol and 7% by weight of water) _____milliliters__ 225

The mixture was then heated to 105° C. for three hours. At the end of the three hour period (25 milliliters) water and (200 milliliters) organic solvent were distilled into a Dean-Stark trap. The remaining mixture was cooled to room temperature. The mixture weighed 1077 grams and had a total solids content of 50.2%.

Example 2

The following ingredients were mixed in a dropping funnel and added to 500 ml. of refluxing n-butanol over the course of two hours, with nitrogen purge:

Grams
Methyl methacrylate _____ 250
(2-hydroxy) propyl methacrylate _____ 100
Ethyl acrylate _____ 150
n-Dodecyl mercaptan _____ 5
Cumene hydroperoxide _____ 5

Refluxing was then continued for an additional four hours. The resulting mixture weighed 885 grams and had a total solids content of 56.4%. The non-volatile residue was 500 grams.

Example 3

The following ingredients were mixed in a dropping funnel and added to 500 grams of refluxing xylene over a three hour period:

Grams
Methyl methacrylate _____ 250
Glycidyl methacrylate _____ 100
Ethyl acrylate _____ 150
n-Dodecyl mercaptan _____ 5
Di-t-butyl peroxide _____ 5

Refluxing was then continued for an additional three hours. The resulting mixture had a total solids content of 50.3% and weighed 1005 grams. The non-volatile residue was 500 grams.

Example 4

The following ingredients were added to 125 grams of refluxing xylene over a two hour period:

Grams
Methyl methacrylate _____ 90
Ethyl acrylate _____ 90
Methacrylic acid _____ 20
Di-t-butyl peroxide _____ 4
n-Dodecyl mercaptan _____ 2

Refluxing was then continued for two hours. The resulting mixture had a total solids content of 57.3%. The non-volatile residue was 200 grams.

Example 5

(A) The following materials were added to a 250 milliliter, 3 neck round bottom flask equipped with a stirrer, a reflux condenser, and a thermometer:

Grams
Hexafluoro isopropyl methacrylate _____ 21.25
Acrylamide _____ 3.75
n-Butanol _____ 100

The mixture was then heated to reflux conditions (approximately 117° C.) and n-dodecyl mercaptan and cumene hydroperoxide were added periodically to the mixture in the folloing manner:

| Time (hrs.) | 0 | 1 | 2 | 3 | 4 | 5 |
|---|---|---|---|---|---|---|
| n-Dodecyl mercaptan (ml.) | 3 | 2 | 2 | 1 | 1 | 0 |
| Cumene hydroperoxide (ml.) | 1 | 1 | 1 | 1 | 1 | 0 |

After six hours of refluxing, the mixture was cooled to 90° C. and the following ingredients were added to the cooled mixture:

Maleic anhydride _____gram__ 0.3
Butyl Formcel _____milliliters__ 20

The mixture was then heated to about 105° C. for one hour. Approximately 25 milliliters of organic solvent and water were removed in a Dean-Stark trap. The remaining polymeric mixture was cooled to room temperature and decanted. The mixture weighed 134.3 grams and had a total solids content of 15.09%. The non-volatile residue was 20.2 grams. The analysis of the thermosettable polymeric material is shown in the following table:

| | Percent |
|---|---|
| C | 51.52 |
| H | 6.48 |
| N | 3.55 |
| F | 18.78 |
| S | 4.41 |

(B) The physical mixture of the thermosettable solution of Examples 1 and 5, i.e. mixtures of the thermosettable non-fluorine-containing copolymer and the thermosettable fluorine copolymer was prepared in varying proportions and coated on a smooth glass surface. The thermosettable polymeric mixture was then cured for about 20 minutes at about 150° C. in a forced draft oven to yield a hard smooth film having excellent adhesion to the glass surface. The following table shows the contact angles which were obtained by placing drops of water and $C_6$ to $C_{16}$ normal paraffinic hydrocarbon solvents on the surface of the cured film. The contact angle values are a measure of the surface free energy of the cured film for each hydrocarbon solvent employed and such values are directly related to the percentage of fluorochemical composition in the film. The table also shows the critical surface tension which was obtained by plotting the cosine of the contact angles against the surface tension of the hydrocarbon solvents.

Example 7

(A) The following ingredients were added to a 250 milliliter, three neck, round bottom flask equipped with a stirrer, reflux condenser and a thermometer:

| | Grams |
|---|---|
| Perfluoro cyclohexane carbinol methacrylate | 42.5 |
| Acrylamide | 7.5 |
| n-Butanol | 100 |

The mixture of ingredients was then heated to reflux conditions (approximate 170° C.) and n-dodecyl mercaptan, a chain transfer agent, and a 50% solution of cumene hydroperoxide, an initiator, were added periodically to the mixture in the following manner:

| Time (hrs.) | 0 | 1 | 2 | 3 | 4 | 5 |
|---|---|---|---|---|---|---|
| n-Dodecyl mercaptan (ml.) | 5 | 2 | 2 | 0 | 0 | 0 |
| Cumene hydroperoxide (ml.) | 1 | 1 | 1 | 1 | 1 | 0 |

After six hours of refluxing the mixture was cooled to 90° C. and the following ingredients were added to the cooled mixture:

Maleic anhydride _____grams__ 0.2
Butyl Formcel _____milliliters__ 20

The mixture was then heated to approximately 105° C. for one hour. Organic solvent and water were removed in a Dean-Stark trap and the remaining polymeric mixture was cooled to room temperature.

The resulting thermosettable polymeric mixture had the following analysis:

| | Percent |
|---|---|
| C | 45.43 |
| H | 4.71 |
| N | 4.03 |
| F | 30.72 |
| S | 2.61 |

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 52 | 50 | 39 | 33 | 19 | | | 90 | 21.5 |
| 82.9 | 55 | 53 | 50 | 38 | 28 | | | 89 | 20.9 |
| 46.6 | 52 | 45 | 39 | 36 | 28 | 19 | | 90 | 19.8 |
| 11.9 | 58 | 52 | 49 | 43 | 36 | 29 | 9 | 95 | 19.1 |
| 3.24 | 60 | 54 | 48 | 46 | 35 | 25 | 9 | 106 | 19.3 |
| 1.72 | 58 | 56 | 50 | 45 | 39 | 29 | 10 | 100 | 19.2 |
| 0.428 | 54 | 54 | 48 | 43 | 39 | 27 | 12 | 103 | 19.0 |
| 0.093 | 51 | 48 | 44 | 39 | 26 | 10 | | 87 | 20.5 |
| 0.0024 | 29 | 25 | 21 | | | | | 83 | 24.5 |
| 0.000 | 12 | | | | | | | | 28 |

Example 6

The procedures of Example 5, Part B, are substantially repeated except that the copolymer of Example 2 is substituted for that of Example 1. The contact angles and critical surface tension are set forth in the table below.

(B) Following the procedure set forth in Example 5, physical mixtures of the thermosettable solutions of Examples 1 and 7 were prepared in varying proportions, coated on a smooth glass surface and cured. The follow-

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 41 | 46 | 36 | 35 | 18 | | | 92 | 21.3 |
| 91.2 | 54 | 50 | 46 | 35 | 26 | 15 | | 91 | 20.1 |
| 15.3 | 50 | 42 | 37 | 35 | 25 | 17 | | 92 | 19.9 |
| 1.72 | 55 | 44 | 37 | 36 | 22 | 19 | | 90 | 19.9 |
| 0.11 | 56 | 40 | 33 | 30 | 20 | 15 | | 90 | 20.1 |
| 0.042 | 58 | 46 | 36 | 34 | 25 | 17 | | 92 | 19.9 |
| 0.0026 | 29 | 19 | | | | | | 85 | 25.0 |
| 0.000 | | | | | | | | | >27 | ing table shows the contact angles and the critical surface tension which were obtained for these mixtures:

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 66 | 61 | 56 | 48 | 31 | 24 | | 108 | 20.0 |
| 88 | 68 | 63 | 59 | 53 | 39 | 32 | | | 19.4 |
| 19 | 69 | 65 | 62 | 57 | 44 | 34 | 26 | 108 | 18.4 |
| 8.8 | 66 | 64 | 61 | 59 | 51 | 43 | 31 | | 16.9 |
| 0.94 | 68 | 65 | 61 | 56 | 50 | 45 | 32 | 108 | 16.8 |
| 0.20 | 69 | 65 | 61 | 58 | 51 | 43 | 32 | 108 | 16.8 |
| 0.073 | 68 | 65 | 61 | 58 | 52 | 44 | 34 | 112 | 16.8 |
| 0.064 | 66 | 63 | 60 | 56 | 51 | 41 | 32 | 113 | 17.1 |
| 0.050 | 65 | 62 | 59 | 54 | 46 | 39 | 28 | 89 | 17.1 |
| 0.0068 | 47 | 41 | 31 | 22 | | | | 84 | 22.9 |
| 0.000 | 16 | | | | | | | 80 | 28 |

Example 8

The procedures of Example 7 are substantially repeated except that, in Part B, the thermosettable solution of Example 3 is substituted for that of Example 1. The contact angles and critical surface tension are set forth in the table below.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 36 | 32 | 25 | 18 | | | | 90 | 23.2 |
| 84.2 | 35 | 29 | 21 | 15 | | | | 93 | 23.2 |
| 4.3 | 45 | 29 | 27 | 22 | 17 | | | 93 | 21.5 |
| 0.58 | 46 | 34 | 28 | 21 | 14 | | | 92 | 21.5 |
| 0.029 | 43 | 36 | 22 | 15 | | | | 93 | 23.4 |
| 0.0018 | 31 | 25 | <10 | | | | | 85 | 25.2 |
| 0.000 | | | | | | | | 75 | >27 |

Example 9

Following the procedure of Example 7, acrylamide was reacted with the monomer $CH_2C(CH_3)COOCH_2(CF_2)_7F$ and then with formaldehyde to form a thermosettable fluorine-containing copolymer.

The resulting thermosettable fluorine-containing copolymer was then blended in varying proportions with the thermosettable non-fluorine-containing copolymer of Example 1. The contact angles and critical surface tension of these thermosettable polymeric mixtures were determined by the procedures set forth in Example 5.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 68 | 63 | 57 | 55 | 46 | 39 | 24 | 98 | 18.1 |
| 87.9 | 68 | 67 | 63 | 59 | 49 | 35 | 30 | 96 | 17.2 |
| 14.1 | 67 | 63 | 60 | 56 | 49 | 44 | 35 | 85 | 16.7 |
| 2.92 | 60 | 66 | 63 | 59 | 54 | 45 | 34 | 105 | 16.9 |
| 1.57 | 70 | 63 | 57 | 54 | 54 | 48 | 33 | | 16.7 |
| 0.436 | 72 | 69 | 65 | 62 | 57 | 46 | 37 | 113 | 16.7 |
| 0.101 | 71 | 62 | 57 | 56 | 56 | 37 | 35 | 113 | 16.8 |
| 0.0061 | 36 | 32 | 25 | 15 | | | | 23.6 | 23.6 |
| 0.000 | 16 | | | | | | | | ~28 |

Example 10

Following the procedure of Example 7, acrylamide was reacted with the monomer $CH_2C(CH_3)COOCH_2(CF_2)_4H$ and then with formaldehyde to form a thermosettable fluorine-containing copolymer.

The resulting fluorine-containing copolymer was then blended in varying proportions with the thermosettable nonfluorine-containing copolymer of Example 1. The contact angles and critical surface tension of these thermosettable polymeric mixtures were determined by the procedures set forth in Example 5.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 35 | 35 | 25 | | | | | 88 | 24.6 |
| 91.0 | 43 | 36 | 26 | 7 | | | | 82 | 24.3 |
| 48.5 | 48 | 46 | 41 | 22 | | | | 88 | 23.3 |
| 25.4 | 47 | 45 | 36 | 31 | 18 | | | 98 | 21.5 |
| 5.83 | 51 | 48 | 45 | 41 | 34 | 17 | <10 | 90 | 19.9 |
| 4.14 | 54 | 49 | 47 | 35 | 28 | 18 | <10 | 95 | 20.0 |
| 0.610 | 46 | 43 | 42 | 39 | 31 | | | 90 | 21.0 |
| 0.260 | 45 | 41 | 39 | 32 | 16 | | | 84 | 21.7 |
| 0.0444 | 34 | 26 | 19 | | | | | 77 | 25 |
| 0.000 | 10 | | | | | | | 80 | ~27 |

Example 11

Following the procedure of Example 7, acrylamide was reacted with the monomer $CH_2CHCOOCH_2(CF_2)_6H$ and then formaldehyde to form a thermosettable fluorine-containing copolymer.

The resulting thermosettable fluorine-containing copolymer was then blended in varying proportions with the thermosettable non-fluorine-containing copolymer of Example 1. The contact angles and critical surface tension of these thermosettable polymeric mixtures were determined by the procedures set forth in Example 5.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 51 | 47 | 42 | 32 | 22 | | | 81 | 21.7 |
| 87.0 | 58 | 46 | 43 | 36 | 23 | 10 | | 90 | 20.5 |
| 30.9 | 53 | 50 | 47 | 40 | 34 | 20 | 14 | 98 | 19.8 |
| 5.84 | 52 | 48 | 46 | 42 | 36 | 27 | 10 | 87 | 18.8 |
| 2.81 | 50 | 50 | 47 | 42 | 31 | 28 | 10 | 90 | 18.9 |
| 2.55 | 53 | 51 | 46 | 36 | 32 | 25 | 11 | 87 | 19.2 |
| 0.470 | 56 | 53 | 50 | 44 | 36 | 29 | 12 | 90 | 19.0 |
| 0.177 | 53 | 48 | 43 | 37 | 34 | 22 | 13 | 90 | 19.0 |
| 0.024 | 34 | 29 | 24 | 16 | | | | 80 | 23.5 |
| 0.000 | 12 | | | | | | | 81 | ~28 |

Example 12

Following the procedure of Example 7, acrylamide was reacted with the monomer $$CH_2C(CH_3)COOCH_2(CF_2)_{10}H$$

and then with formaldehyde to form a thermosettable fluorine-containing copolymer.

The resulting thermosettable fluorine-containing copolymer was then blended in varying proportions with the thermosettable non-fluorine-containing copolymer of Example 1. The contact angles and critical surface tension of these thermosettable polymeric mixtures were determined by the procedures set forth in Example 5.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 80 | 74 | 57 | 42 | 27 | 22 | 15 | 71 | 18.5 |
| 37.1 | 106 | 74 | 72 | 60 | 43 | 30 | 30 | | 18.2 |
| 21.0 | 81 | 66 | 65 | 48 | 42 | 39 | 29 | 98 | 18.2 |
| 11.5 | 71 | 71 | 61 | 52 | 47 | 34 | 27 | 97 | 18.2 |
| 9.1 | 73 | 67 | 65 | 50 | 48 | 33 | 25 | 105 | 18.2 |
| 1.3 | 61 | 61 | 56 | 53 | 43 | 37 | 27 | | 18.2 |
| 0.47 | 61 | 60 | 57 | 50 | 41 | 35 | 21 | | 18.2 |
| 0.25 | 68 | 59 | 56 | 52 | 37 | 27 | 25 | | 18.0 |
| 0.04 | 30 | 40 | 35 | 30 | 20 | 17 | 14 | 90 | 18.5 |
| 0.00 | 0 | | | | | | | 72 | >27.8 |

Example 13

Following the procedure of Example 7, acrylamide was reacted with the monomer $CH_2CHCOOCH_2C_3F_7$ and then with formaldehyde to form a thermosettable fluorine-containing copolymer.

The resulting thermosettable fluorine-containing copolymer was then blended in varying proportions with the thermosettable non-fluorine-containing copolymer of Example 1. The contact angles and critical surface tension of these thermosettable polymeric mixtures were determined by the procedures set forth in Example 5.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 54 | 47 | 42 | 36 | 26 | 20 | 10 | 90 | 18.5 |
| 66.4 | 59 | 55 | 46 | 40 | 34 | 28 | 16 | 104 | 17.7 |
| 32.7 | 57 | 50 | 47 | 43 | 37 | 30 | 17 | | 17.9 |
| 11.8 | 56 | 50 | 47 | 40 | 35 | 29 | 17 | 100 | 17.7 |
| 3.2 | 61 | 56 | 49 | 44 | 36 | 29 | 20 | | 17.8 |
| 3.2 | 62 | 53 | 49 | 44 | 36 | 28 | 16 | 100 | 18.0 |
| 1.2 | 59 | 54 | 49 | 45 | 36 | 26 | 17 | 103 | 18.0 |
| 0.37 | 61 | 55 | 49 | 44 | 35 | 28 | 21 | 104 | 17.8 |
| 0.0015 | 27 | 19 | | | | | | 81 | |
| 0.000 | | | | | | | | | >28 |

Example 14

The procedures of Example 13 are substantially repeated except that the copolymer of Example 4 is substituted for that of Example 1. The contact angles and critical surface tension are set forth in the table below.

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 83 | 72 | 60 | 42 | 33 | 28 | 17 | 72 | 17.9 |
| 8.3 | 84 | 70 | 62 | 43 | 35 | 31 | 22 | 79 | 18.0 |
| 0.42 | 84 | 71 | 61 | 45 | 33 | 29 | 21 | 90 | 18.0 |
| 0.069 | 81 | 70 | 59 | 45 | 32 | 30 | 23 | 92 | 18.0 |
| 0.0021 | 87 | 65 | 42 | 35 | 29 | 21 | | 89 | 18.5 |
| 0.000 | | | | | | | | 70 | >27 |

Example 15

Following the procedure of Example 7, acrylamide was reacted with the monomer $CH_2CHCOOCH_2C_2F_5$ and The resulting thermosettable fluorine-containing copolymer was then blended in varying proportions with the thermosettable non-fluorine-containing copolymer of Example 1. The contact angles and critical surface tension of these thermosettable polymeric mixtures were determined by the procedures set forth in Example 5.

CONTACT ANGLE

| Percent fluorine containing copolymer in mixture | Normal hydrocarbon solvents | | | | | | | Water ($H_2O$) | Critical surface tension (dynes/cm.) |
|---|---|---|---|---|---|---|---|---|---|
| | $C_{16}$ | $C_{14}$ | $C_{12}$ | $C_{10}$ | $C_8$ | $C_7$ | $C_6$ | | |
| 100 | 73 | 70 | 54 | 45 | 37 | | | 73 | 20.9 |
| 40 | 58 | 58 | 50 | 45 | 35 | | | 90 | 20.9 |
| 23.2 | 58 | 53 | 50 | 48 | 28 | | | 95 | 20.9 |
| 11.0 | 57 | 54 | 50 | 44 | 31 | 15 | | 77 | 20.3 |
| 5.3 | 57 | 53 | 48 | 43 | 32 | 21 | | 70 | 20.2 |
| 1.6 | 55 | 52 | 49 | 43 | 34 | 26 | 15 | 80 | 18.0 |
| 0.66 | 48 | 48 | 46 | 41 | 32 | 25 | 17 | 95 | 18.0 |
| 0.30 | 54 | 53 | 48 | 44 | 31 | 26 | 15 | 92 | 18.0 |
| 0.05 | 47 | 45 | 37 | 34 | 24 | 15 | | 93 | 20.4 |
| 0.00 | | | | | | | | 76 | |

Example 16

Following the procedure of Example 7, acrylamide is reacted with the monomer $$CH_2C(CH_3)COOCH_2(c\text{-}C_6F_{10})C_2F_5$$

where c- designates an alicyclic structure, and then with formaldehyde to form a thermosettable fluorine-containing copolymer.

The resulting thermosettable fluorine-containing copolymer is then blended with the thermosettable non-fluorine containing copolymer of Example 1. The critical surface tension of the thermosettable polymeric mixture is determined by the procedures set forth in Example 5 as being 18.1.

Extremely good salt spray and detergent resistance are obtained when the thermosettable polymeric mixture of this example is sprayed onto both primed and unprimed steel panels to a film thickness of 1.3 mils and cured for 30 minutes at 150° C.

In the preceding examples where acrylamide was employed, other similar amide-containing compounds may also be used. Examples include methacrylamide, N-methyl acrylamide, N-methyl methacrylamide, N-ethyl acrylamide, N-ethyl methacrylamide, N-propyl acrylamide, N-propyl methacrylamide, N-butyl acrylamide, N-butyl methacrylamide and the like.

Pigments such as titanium dioxide, carbon black and the like can be added to the coating compositions of this invention to form any desired color. Other ingredients normally found in coating compositions, such as germicides, fillers, driers, silicones and the like can be added.

The thermosettable polymeric mixtures of this invention may be used alone as coating compositions for the treatment of solid surfaces or in combination with other resins. Resins especially suitable for use in combination with the thermosettable polymeric mixtures of this invention are phenol-formaldehyde, epoxy, melamine-formaldehyde, urea-formaldehyde, cellulosic resins, vinyl resins, polyester resins and acrylic resins.

Among the beneficial properties imparted to surfaces treated with the thermosettable polymeric mixtures of this invention are oil and water repellency and reduced adhesion to waxes, asphalts, glues, dirt and similar materials. Lower coefficients of friction are realized which serve to reduce the erosion of the coating under abrasive stresses. The coatings produced by the curing of the thermosettable polymeric mixtures of the present invention are characterized by a high degree of hardness, flexibility, adhesion, impact resistance, acid resistance, solvent resistance and salt spray resistance. As such they have excellent outdoor aging durability and the ability to impart outstanding surface properties to various substrates, i.e. low coefficient of friction, as well as outstanding repellency to aqueous and organic media.

The thermosettable polymeric mixture of this invention may be used as mold release agents, and paint additives. When employed in coating compositions, the thermosettable polymeric mixtures of this invention provide a surface which is oil resistant and does not soil in a degree comparable to the same untreated surface. The unique surface characteristics also serve to make the thermosettable polymeric mixtures extremely useful as coatings on industrial rolls in applications where it is desirable to prevent accumulation of materials which would otherwise adhere tenaciously, such as the wax coating of paper or paperboard.

Obviously, many modifications and variations of the present invention as heretofore set forth may be made without departing from the spirit and scope thereof and therefore, only such limitations shoul be imposed as indicated in the appended claims.

What is claimed is:

1. A thermosettable polymeric composition consisting essentially of a mixture of:
   (a) from about 0.10% to 2.92% by weight of a thermosettable fluorine-containing copolymer prepared by methylolating a fluorocarbon amide-containing acrylic copolymer having a molecular weight in the range of between 1500 and 3000 with an aldehyde in an amount from about 0.4 to about 3 moles per mole of aldehyde-reactable amide side chains, said aldehyde having the structure:

$$R-\overset{\overset{O}{\|}}{C}-H$$

Where R is H, a $C_1$–$C_4$ alkyl group or

the acrylic copolymer consisting essentially of from about 5% to about 30% by weight of at least one amide-containing polymerizable monomer having the structure:

$$CH_2{=}\overset{\overset{R_1}{|}}{C}{-}CONHR_2$$

where $R_1$ is H or $CH_3$ and $R_2$ is H or a $C_1$–$C_4$ alkyl group, and from about 70% to about 95% by weight of a monomer having the structure:

$$R_f P$$

where $R_f$ is:
   (c-$C_6F_{11}$)$CH_2$—, where c- designates an alicyclic structure
   $R_1(CF_2)_a CH_2$—, where $R_1$ is F or H and $a$ is an integer from 1 to 20,
   $(CF_3)_2 CR_2(CF_2)_b$—, where $R_2$ is F or H when $b$ is 0, and $R_2$ is F when $b$ is an integer from 1 to 18 or
   $R_3$(c-$C_6F_{10}$)$CH_2$—, where $R_3$ is F or $C_nF_{2n+1}$ and $n$ is an integer from 1 to 4 and c- designates an alicyclic structure, and
where P is —OOCCR$_4$=CH$_2$, and $R_4$ is H or CH$_3$, and (b) from about 99.899 to 97.08% by weight of a thermosettable non-fluorine containing copolymer
 (i) prepared by methylolating an amide-containing acrylic copolymer with an aldehyde in an amount from about 0.4 to 3 moles per mole of aldehyde-reactable amide side chains, said aldehyde having the structure:

$$R-\overset{O}{\underset{\|}{C}}-H$$

where R is H, a $C_1$–$C_4$ alkyl group or

the acrylic copolymer comprising from about 97% to about 75% by weight of at least one ethylenically unsaturated monomer and from about 3% to about 25% by weight of an amide-containing polymerizable monomer having the structure:

$$\underset{CH_2=\overset{R_1}{\underset{|}{C}}-CONHR_2}{}$$

where $R_1$ is H or $CH_3$ and $R_2$ is H or a $C_1$–$C_4$ alkyl group, or (ii) prepared by reacting from about 97% to about 75% by weight of at least one ethylenically unsaturated monomer and from about 3% to about 25% by weight of a monomer having the structure:

$$\underset{CH_2=\overset{R_1}{\underset{|}{C}}-COM}{}$$

where $R_1$ is H or $CH_3$, and M is —OH, —O—$CH_2$—$CHR_2OH$, where $R_2$ is H or a $C_1$–$C_4$ alkyl group, —$OCH_2$—CH—$CH_2$ or —O—$CH_2CH$=$CH_2$
   \\O/

2. The thermosettable polymeric composition of claim 1 wherein the aldehyde is formaldehyde, acetyl aldehyde, butyryl aldehyde, isobutyryl aldehyde or furfuraldehyde.

3. The thermosettable polymeric composition of claim 2 wherein the amide-containing monomer is acrylamide or methacrylamide.

4. The thermosettable polymeric composition of claim 3 wherein the monomer $R_fP$ is hexafluoro isopropyl methacrylate and the non-fluorine containing copolymer is a copolymerization product of a copolymer of methyl methacrylate and ethyl acrylate, and 2-hydroxy propyl methacrylate.

5. The thermosettable polymeric composition of claim 3 wherein the monomer $R_fP$ is perfluorocyclohexane carbinol methacrylate and the non-fluorine containing copolymer is a methylolated copolymerization product of a copolymer of ethyl acrylate and styrene, and acrylamide.

6. A process for coating solid surfaces which comprises:
 (1) applying a thermosettable polymeric composition to the surface, the composition consisting essentially of a mixture of:
  (a) from about 0.10% to 2.92% by weight of a thermosettable fluorine - containing copolymer prepared by methylolating a fluorocarbon amide-containing acrylic copolymer having a molecular weight in the range of between 1500 and 3000 with an aldehyde in an amount from about 0.4 to about 3 moles per mole of aldehyde having the structure:

$$R-\overset{O}{\underset{\|}{C}}-H$$

where R is H, a $C_1$–$C_4$ alkyl group or

the acrylic copolymer consisting essentially of from about 5% to about 30% by weight of at least one amide - containing polymerizable monomer having the structure:

$$\underset{CH_2=\overset{R_1}{\underset{|}{C}}-CONHR_2}{}$$

where $R_1$ is H or $CH_3$ and $R_2$ is H or a $C_1$–$C_4$ alkyl group, and from about 70% to about 95% by weight of a monomer having the structure:

$$R_fP$$

where $R_f$ is:
 (c-$C_6F_{11}$)$CH_2$, where c- designates an alicyclic structure
 $R_1(CF_2)_aCH_2$—, where $R_1$ is F or H and $a$ is an integer from 1 to 20,
 $(CF_3)_2CR_2(CF_2)_b$—, where $R_2$ is F or H when $b$ is 0, and $R_2$ is F when $b$ is an integer from 1 to 10, or
 $R_3$(c-$C_6F_{10}$)—$CH_2$—, where $R_3$ is F or $C_nF_{2n+1}$ and $n$ is an integer from 1 to 4 and c- designates an alicyclic structure, and
where P is —$OOCCR_4$=$CH_2$, and $R_4$ is H or $CH_3$, and (b) from about 99.898 to 97.08% by weight of a thermosettable non-fluorine containing copolymer (i) prepared by methylolating an amide-containing acrylic copolymer with an aldehyde in an amount from about 0.4 to 3 moles per mole of aldehyde-reactable amide side chains, said aldehyde having the structure:

$$R-\overset{O}{\underset{\|}{C}}-H$$

where R is H, a $C_1$–$C_4$ alkyl group or

the acrylic copolymer comprising from about 97% to about 75% by weight of at least one ethylenically unsaturated monomer and from about 3% to about 25% by weight of an amide-containing polymerizable monomer having the structure:

$$\underset{CH_2=\overset{R_1}{\underset{|}{C}}-CONHR_2}{}$$

where $R_1$ is H or $CH_3$ and $R_2$ is H or a $C_1$–$C_4$ alkyl group, or (ii) prepared by reacting from about 97% to about 75% by weight of at least one ethylenically unsaturated monomer and from about 3% to about 25% by weight of a monomer having the structure:

$$\underset{CH_2=\overset{R_1}{\underset{|}{C}}-COM}{}$$

where $R_1$ is H or $CH_3$, and M is —OH, —O—$CH_2$—$CHR_2OH$, where $R_2$ is H or a $C_1$–$C_4$ alkyl group, —$OCH_2$—CH—$CH_2$, or —O—$CH_2CH$=$CH_2$ (2) heating the coated surface to a temperature of from about 75° C. to about 200° C. for a period of from about ten minutes to about ten hours, and (3) subsequently cooling the resulting coated surface.

7. The process according to claim 6 wherein the aldehyde is formaldehyde, acetyl aldehyde, butyryl aldehyde, isobutyryl aldehyde or furfuraldehyde.

8. The process according to claim 7 wherein the amide-containing monomer is acrylamide or methacrylamide.

9. The process according to claim 8 wherein the monomer $R_fP$ is hexafluoro isopropyl methacrylate and the non-fluorine containing copolymer is a copolymerization product of a copolymer of methyl methacrylate and ethyl acrylate, and 2-hydroxy propyl methacrylate.

10. The process according to claim 8 wherein the monomer $R_fP$ is perfluorocyclohexane carbinol methacrylate and the non-fluorine containing copolymer is a methylolated copolymerization product of a copolymer of ethyl acrylate and styrene, and acrylamide.

References Cited

UNITED STATES PATENTS

| 3,256,230 | 6/1966 | Johnson et al. | 260—900 |
|---|---|---|---|
| 3,438,925 | 4/1969 | Raynolds et al. | 260—900 |
| 3,428,709 | 2/1969 | Kleiner | 260—900 |
| 3,533,977 | 10/1970 | Read | 260—853 |
| 3,491,169 | 1/1970 | Raynolds et al. | 260—856 |
| 3,497,575 | 2/1970 | Kleiner et al. | 260—900 |
| 3,378,609 | 4/1968 | Fasick et al. | 260—900 |
| 3,341,497 | 9/1967 | Sherman et al. | 260—853 |

JOHN C. BLEUTGE, Primary Examiner

U.S. Cl. X.R.

117—124 E, 132 BF, 132 CF, 161 LN; 260—86.1, 87.5, 834, 836, 847, 850